United States Patent [19]

Frost

[11] 4,181,041
[45] Jan. 1, 1980

[54] DUAL PATH, DUAL RANGE TRANSMISSION

[75] Inventor: Barry L. Frost, Jackson, Mich.

[73] Assignee: Clark Equipment Company, Buchanan, Mich.

[21] Appl. No.: 788,176

[22] Filed: Apr. 18, 1977

[51] Int. Cl.$^2$ ............... F16H 47/04; F16H 3/44
[52] U.S. Cl. ........................... 74/687; 74/750 R
[58] Field of Search ............... 74/665 R, 665 A, 674, 74/681, 687, 342, 750 R

[56] References Cited

U.S. PATENT DOCUMENTS

| | | | |
|---|---|---|---|
| 1,829,725 | 11/1931 | Alden | 74/342 |
| 3,433,095 | 3/1969 | Tuck | 74/687 |
| 3,534,632 | 10/1970 | Smith | 74/687 |
| 3,597,997 | 8/1971 | Phillips | 74/687 |
| 3,777,594 | 12/1973 | Frost | 74/687 |

*Primary Examiner*—Benjamin W. Wyche
*Assistant Examiner*—James Yates
*Attorney, Agent, or Firm*—Ernst H. Ruf

[57] ABSTRACT

A dual path, dual range transmission utilizes two simple planetaries with a sliding shaft shift wherein a first ring gear is in constant mesh with the first planet gear, the second ring gear is connected with the first carrier and the second ring gear is also in constant mesh with the second planet gear. A variable speed device, drivingly connected with the input shaft, controllably varies the rotative speed of a variable speed control shaft which is connected with the first and second sun gears. The input shaft is also independently drivingly connected with the first ring gear and the second planet carrier, with the output shaft being connected with the first carrier. Means are provided for alternately first moving the first sun gear into mesh with the first planet gear, when the pitch line velocity of the first planet gear, relative to the first planet carrier, is substantially the same as the pitch line velocity of the first sun gear, and out of mesh when they are rotating under load, and secondly for moving the second sun gear into mesh with the second planet gear, when the pitch line velocity of the second planet gear, relative to the second planet carrier, is substantially the same as the pitch line velocity of the second sun gear, and out of mesh when they are under load, with this means for moving being activated only when the control shaft is rotating at a selected speed relative to the speed of the two sun gears.

12 Claims, 3 Drawing Figures

DUAL PATH, DUAL RANGE TRANSMISSION

BACKGROUND OF THE INVENTION

1. Field of the Invention

The field of art to which which this invention pertains includes that of machine elements and mechanisms, more specifically, variable speed dual path, dual range transmission having two simple planetaries with a sliding shaft shift.

2. Description of the Prior Art

My own prior art extended range dual-path transmission, as set forth in U.S. Pat. No. 3,918,325, preferably takes the form of a dual-range hydromechanical transmission, i.e., having a mechanical power path and a hydraulic power path in each of its two speed ranges. The mechanical power path of this prior art transmission utilizes a combination in which two sets of planet gears are mounted on the same carrier and in mesh with each other. In addition, each set of planet gears meshes with a separate input member, typically, two separate ring gears, with one of the sets of planet gears being in mesh with the sun or reaction gear. The common carrier comprises the output member for both planetary gear sets and is drivingly connected with an output shaft. The planetary gearing is used in combination with a variable speed device, preferably a hydraulic pump-motor combination, wherein selectively operable low and high range clutches are provided for controlling the connection to the output planetary gearing. Therefore, the high and low range clutches are the means for alternately connecting the two transmission ranges to the output shaft.

This prior art transmission has performed very well indeed. The clutching, however, has been accomplished by means of well known friction clutch mechanisms, and, therefore, all of the well known deficiencies of these mechanisms, including cost, size, wear and life, have been inherited by this transmission.

My further prior U.S. Pat. No. 3,777,594 discloses a variable speed, multi-range, transmission wherein the usual clutches are not employed. Instead, it uses a relatively wide coupling gear which may be axially shifted into mesh with a first gear and out of mesh with a second gear when the operating pitch line velocities of the movable coupling gear and the second gear are substantially equal. The FIG. 3 embodiment of this prior art patent shows the use of two simple planetary assemblies wherein a movable external coupling gear can alternately couple the input shaft with the ring gear of a first planetary assembly and the planet carrier of a second planetary assembly. This mechanism is based on the fact that meshed gears (including spur gears and thrust balanced helical gears) will move axially relative to one another, while meshed, without the interruption of power flow therebetween, and therefore may enter into or leave a given power path without the clashing of teeth, binding due to bias, or locking due to an inability of splined parts to slide relative to one another while under load.

A shortcoming of this prior art transmission is the width and external location of the coupling gear, both of which add extra complexity and expense.

SUMMARY OF THE INVENTION

In carrying out my invention in one preferred embodiment thereof, I provide a variable speed dual-path transmission with two infinitely variable ranges. A first planetary means has first, second, third and fourth elements, while a second planetary means has fifth, sixth, seventh and eighth elements. The fourth element is in constant mesh with the second element, while the eighth element is connected to rotate and be rotated by the third element, with the eighth element also being in constant mesh with the sixth element. An input shaft is drivingly connected with the fourth and seventh elements and with a variable speed device which provides means for controllably varying the rotative speed of a control shaft connected thereto. The control shaft in turn is connected to rotate and be rotated by the first and fifth elements and an output shaft is connected to rotate and be rotated by the third element. Means are provided for alternately moving the first element into mesh with a second element when the pitch line velocity of the second element, relative to the third element, is substantially the same as the pitch line velocity of the first element and out of mesh with the second element when the first and second elements are rotating under load, and secondly for moving the fifth element into mesh with the sixth element when the pitch line velocity of the sixth element, relative to the seventh element, is substantially the same as the pitch line velocity of the fifth element and out of mesh with the sixth element when the fifth and sixth elements are rotating under load. The means for moving is activated only when the control shaft is rotating at a selected speed relative to the speed of the second and sixth elements.

Preferably, the control shaft takes the form of a quill shaft that is rotated by the variable speed device, with the quill shaft having first and second sun gears that are adapted to mesh with first and second planet gears in the first and second planetary assemblies. In addition, the moving means preferably takes the form of a piston that is rotatably journalled on the quill shaft and can be bidirectionally actuated so as to reciprocate the quill shaft and permit the alternate and/or simultaneous meshing of the first and second sun gears with the first and second planet gears, respectively.

The utilization of shiftable sun gears, via an internal sliding shaft, makes the transmission more compact, reduces the number of parts, reduces rotating masses and reduces the complexity of the transmission in comparison to the prior art. In addition, by sliding the sun gear relative to the multiple planets, the sun gear carries only one third the load and permits a quick shift.

The principal object, features and advantages of this invention will be more readily understood by persons skilled in the art when following the detailed description in conjunction with the drawings.

DESCRIPTION OF THE PREFERRED EMBODIMENT

Figure 3:
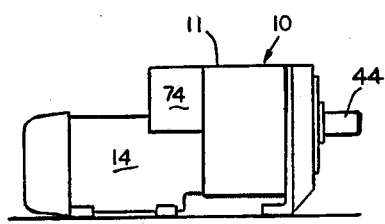
FIG. 3 is a side elevational view of the transmission of this invention attached to a prime mover.
Figure 1:
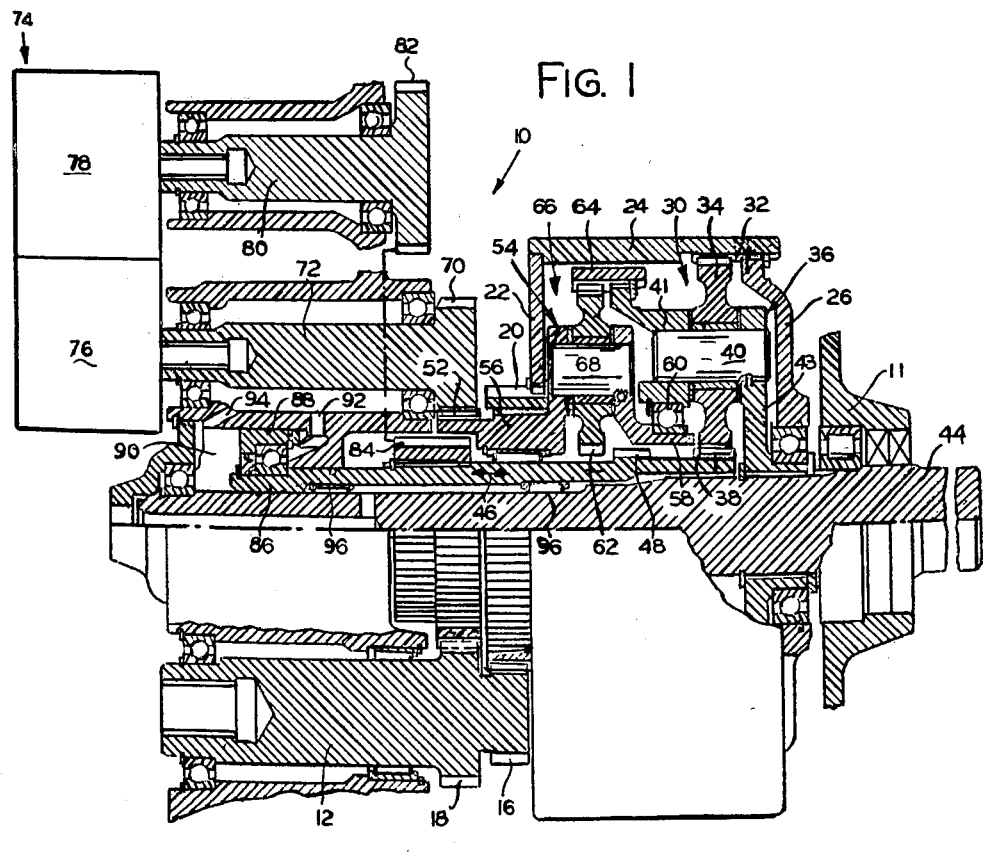
FIG. 1 is a partially schematic or diagrammatic view, in elevation and in section, of a dual path, dual range transmission having two simple planetaries with a sliding shaft shift.

Referring now to the drawings, particularly FIG. 1, the reference numeral 10 generally denotes a variable speed dual-path transmission 10 with two infinitely variable speed ranges having simple planetaries with a sliding shaft shift. The components of transmission 10 are supported in working relationship, relative to one another by a case or housing 11 (only partially shown) and, as is common, the housing may also serve to enclose these components for their protection and lubrication. Transmission 10 has an input shaft 12 that delivers power from a prime mover 14 (FIG. 3), such as an internal combustion engine, electric motor, or other source of power, to first and second coaxial input gears 16 and 18, respectively, mounted on or integral with input shaft 12. First input gear 16 drives intermediate gear 20 which in turn is connected via web 22 with one end of a drum 24 whose other end is connected to a further web 26. Attached to, or forming an integral portion of drum 24, is an internal ring gear 32. Ring gear 32, which is an integral part of a first or low range planetary assembly 30 (also including a plurality of planet gears 34, carrier 36 and sun or reaction gear 38, all of which will be described in more detail), meshes with a plurality of first planet gears 34 (only one of which is shown), with planet gears 34 being mounted on shafts 40 of planet carrier 36. Low range planet carrrier 36 in turn includes operatively interconnected inner and outer portions 41 and 43, respectively, with the latter being fixedly secured to transmission output shaft 44 and also journalling web 26. Low range sun gear 38 is formed on a quill shaft 46, the latter also including an axially spaced high range sun or reaction gear 48 of substantially the same operating pitch diameter as gear 38.

Second input gear 18 meshes with a gear 52 that is formed on an outer portion 56 of a high range carrier 54 that also includes an operatively interconnected carrier inner portion 58. Low range carrier inner portion 41 and high range carrier inner portion 58 are journalled relative to one another via bearing 60. Carrier 54, via shafts 68, journals a plurality of high range planet gears 62 which in turn mesh with high range ring gear 64 carried by low range carrier inner portion 41. In addition, planet gears 62 can also mesh with high range sun gear 48 in a manner to be described hereinafter. Sun gear 48, planet gears 62, carrier 54 and ring gear 64 together constitute a second, or high, range planetary assembly 66.

Figure 2:
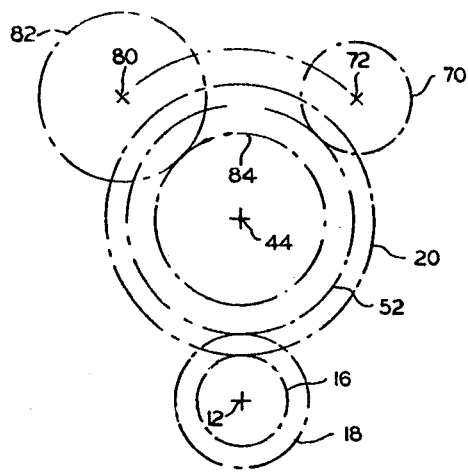
FIG. 2 is a schematic representation of the true location of the input and hydraulic unit gear drive systems relative to the center of the planetary systems.

Gear 52 also meshes with a further gear 70 which, for the convenience of illustration, is shown out of its true position in FIG. 1, but in its true position in FIG. 2. Gear 70 is affixed to or forms part of a drive shaft 72 which is drivingly connected with a first portion 76 (also shown out of its true position) of a schematically-shown variable speed device 74 which in turn includes a second portion 78 that is drivingly connected via drive shaft 80 with a further gear 82. Gear 82, which is shown out of its true position in FIG. 1, but in its actual position in FIG. 2, meshes with a gear 84 affixed to quill shaft 46. Variable speed device 74 may, for example, take the form of a series 18 pump-motor combination manufactured by Sundstrand Hydro-Transmission Division of the Sundstrand Corporation in Ames, Iowa. The function of variable speed device 74 may basically be defined as providing a speed proportional to the speed of the prime mover on one, and a variable speed on the other, of shafts 72 and 80, respectively, as required, to permit the operation of transmission 10 as described hereinafter. By virtue of its geared connection with shaft 80 (via gears 82, 84), quill shaft 46 may also be defined as a variable speed control shaft adapted to rotate or be rotated by variable speed device 74 and the pair of sun gears 38, 48. Thus, variable speed device 74 is adapted to controllably vary the speed of shaft 46 as required to provide the operation of transmission 10 as will be described hereinafter.

An end portion 86 of quill shaft 46 is provided with a rotatably journalled piston 88, the latter also being capable of sealed axial or reciprocating movement within a generally cylindrical cavity 90. Opposite end portions of cavity 90 are provided with ports 92 and 94, respectively, with these ports alternately serving for the ingress and egress of pressurized fluid which in turn causes the axial shifting of quill shaft 46. Axially spaced needle bearings 96, mounted on quill shaft 46, have their needle rollers in direct contact with output shaft 48, thereby permitting both rotational and axial movement of quill shaft 46 relative to output shaft 44.

A dual-path transmission may, as its name implies, be defined as a transmission that has two separate power paths, with the preferred embodiment of transmission 10 being a hydromechanical transmission, i.e., having a mechanical power path and a hydraulic power path in each of its two speed ranges.

By way of explanation, first portion 76 of variable speed device 74 may include a motor-pump device, preferably a hydraulic unit of the variable displacement type. Second portion 78 of variable speed device 74 may include a pump-motor device preferably a hydraulic unit of the fixed displacement type. If portions 76 and 78 are hydraulic units, they are, of course, hydraulically interconnected in a manner well known in the art. In lieu of being a hydraulic device, variable speed device 74, may, for example, also take the form of a variable speed traction device. While dual-path transmission 10, for ease of understanding, will hereinafter be described in the form of a hydromechanical transmission, it should, of course, be understood that it is not limited thereto.

At this point it will be seen that input shaft 12 is coupled to variable speed device first portion 76 by means of a gear train comprising gears 18, 52, and 70. Second portion 78 of variable speed device 74, which is operatively interconnected with first portion 76, in turn is coupled to quill shaft 46 by means of a gear train comprising gears 82 and 84. Quill shaft 46, of course, serves to concomitantly rotate first and second sun gears 38 and 48, respectively.

If, as noted, variable speed device first and second portions 76 and 78, respectively, are hydraulic units, portion 76 serves as a pump while portion 78 serves as a motor, and in the alternative, portion 78 serves as a pump while portion 76 serves as a motor. Portions 76 and 78 regulate the torque being applied to quill or variable speed control shaft 46 from planetary assemblies 30 and 66 by means of sun gears 38 an 48 which serve as reaction members. A perusal of FIG. 1 will show that the axial spacing of sun gears 38 and 48 is such that when sun gear 38 is fully meshed with planet gear 34, then sun gear 48 is completely disengaged from planet gear 62. Upon the ingress of hydraulic fluid through port 92, piston 88, and consequently quill shaft 46, are axially translated to the left. This axial translation causes the gradual disengagement of gears 38 and 34 while at the same time permitting the gradual engagement of gears 48 and 62. For a short time span during the translational movement, low and high range sun gears 38 and 48 are simultaneously engaged with their respective planet gears so that output shaft 44 is connected to be rotated by the actions of both planetary assemblies 30 and 66. The completion of the axial movement of quill shaft 46 will result in the complete intermeshing of high range sun gear 48 with high range planet gears 62 and the complete disengagement of low range sun gear 38 with low range planet gears 34. In downshifting, the axial movement of quill shaft 46 is, of course, reversed, resulting in re-engagement of low range planetary assembly 30 and subsequent disengagement of planetary assembly 66.

At this time it should be clear that first or low range internal ring gear 32 is driven by input shaft 12 through gears 16 and 20. Second or high range internal ring gear 64 is, of course, carried by and therefore driven by low range carrier portion 41. Input shaft 12 also drives high range carrier 54 via gears 18 and 52.

The operation of transmission 10 may be described as follows: Zero output, i.e., when output shaft 44 and carrier 36 are stationary, is achieved when the pitch line velocities of low range ring gear 32 and low range sun gear 38 are equal and opposite. At this time, low range planet gears 34 rotate about their centers on shafts 40, and since carrier 36 is stationary, there is no output. Again, at the same time, since sun gear 38 is driven in the opposite direction to internal ring gear 32, variable speed device portion 78 serves as a pump, while portion 76 serve as a motor, and there is regeneration. What is meant by "regeneration" is that variable speed device 74 recirculates power back into planetary assembly 30 and the total horsepower handled within planetary assembly 30 is, therefore, in this instance that of the prime mover plus that generated through variable speed device 74.

As first internal ring gear 32 continues to rotate and the pitch line velocity of sun gear 38 is gradually reduced, sun gear 38 will act as a reaction element and carrier 36 will start to rotate with the speed of its rotation increasing as the speed of rotation of sun gear 38 decreases. It should be understood that the speed of carrier 36 is based on the physical dimensions of the elements of planetary assembly 30 as such. There is progressively increased output as the speed of low range sun gear 38 is reduced to zero, and when sun gear 38 becomes stationary, it acts as a pure reaction element, and at this time, since the displacement of portion 76 has been reduced to near zero and the regenerative horsepower has disappeared, transmission 10 operates as a purely mechanical system.

However, as soon as sun gear 38 is driven (via variable unit portions 76 and 78) in the same direction as ring gear 32, then the speed of carrier 36 and output shaft 44 increase in relation to the increase in the speed of sun gear 38. Maximum output speed in low range operation is achieved when sun gear 38 is driven at or near its maximum speed in the same direction as ring gear 32, with ring gear 32, sun gear 38 and carrier 36 all rotating in a collective forward direction. At this time, transmission 10 operates as a split-system, i.e., the transmitted horsepower is split between the mechanical and variable speed systems, i.e., planetary assembly 30 and variable speed device 74, with portion 76 serving as a pump and portion 78 serving as a motor.

At this time, it should be noted that the speed of high range carrier 54 is controlled by input gear 18 whereas the speed of high range ring gear 64 is controlled by the speed of low range carrier 36 during low range operation.

At maximum speed in low range, the pitch line velocity of high range planet gears 62 is the same or substantially the same as the pitch line velocity of high range sun gear 48 which means that hydraulic pressure can be applied to the right side of quill shaft piston 88 to thereby axially translate quill shaft 46 to the left. A control system (not shown) is adapted to sense the operating pitch line velocity of gears 62 and signal the point at which this velocity, relative to planet carrier 54, is substantially equal to the operating pitch line velocity of sun gear 48. As is well known in the art, in order to permit gear tooth and gear tooth space alignment between the sun and planet gears preliminary to meshing, the axial shifting of the quill shaft is initiated just prior to the true synchronous speed condition. In other words, a slight speed differential, between the gears to be meshed, is required in order to achieve efficient meshing both in up and down shifting. For a short time, both low and high range planetary assemblies 30 and 66 are engaged, but the completion of the axial shifting of quill shaft 46 will result in the sole meshing of high range sun gear 48 with high range planet gears 62.

In high range operation, when high range sun gear 48 rotates in the same direction as high range carrier 54, at maximum speed, and until the speed of sun gear 48 is reduced to zero, there will be regeneration through the operation of variable speed device 74. By the time the speed of gun gear 48 is reduced to zero, the regeneration has again disappeared and thereafter, when sun gear 48 rotates in the direction opposite to that of its carrier 54, there will again be split path operation. It should, of course, be understood that high range ring gear 64 is the output member of planetary assembly 66 and by virtue of its connection with low range carrier 36 drives output shaft 44. As previously noted, transmission 10 is hydromechanical in both ranges and it is regenerative at zero output speed, with both of these features being known in the prior art. Transmission 10, however, also uses an axially displaceable or translatable quill or variable speed control shaft 46 that serves as the input from variable displacement device 74, with quill shaft 46 having both low and high range sun gears 38 and 48, respectively. One of the major innovations in transmission 10 is the axial translation of sun gears 38 and 48 which permits the up or down shifting from one range to another without the use of an intermediate neutral position or the use of range clutches. It must be pointed out that there has to be rolling or meshing relative motion between the planet and sun gears in order to permit the axial translation of the sun gears under load. If, for example, carrier 36 and sun gear 38 are at the exact some rotating speed, they rotate as a unit since there is zero pitch line velocity between them, and the sun gear cannot be shifted due to torque lock. However, if there is a small pitch line velocity difference between the sun and planet gears, then the sun gears can be axially shifted under load because of the rolling action therebetween. Basically, quill shaft 46 can be shifted under load when the sun gears and the output carrier are at different speeds, with the axial translation of the sun gears taking place when the pitch line velocities of high and low range planet gears 38 and 48 are substantially the same.

The simultaneous axial shifting of the low and high range sun gears permits upshifting or downshifting from one range to the other without requiring the use of an intermediate neutral position or the use of high and low range clutches. The omission of the intermediate neutral position and of the two range clutches, of course, simplifies not only the transmission structure, but also simplifies the control system for the transmission. In addition, it eliminates clutch plate wear problems, clutch noise problems and clutch modulations. Furthermore, the elimination of the clutches makes the unit more compact, reduces manufacturing costs as well as maintenance requirements and in addition, provides a positive shift.

From the foregoing, it is believed that those familiar with the art will readily recognize and appreciate the novel concepts and features of the present invention. Obviously, while the invention has been described in relation to only one preferred embodiment, numerous variations, changes and substitutions of equivalents will present themselves to persons skilled in the art and may be made without necessarily departing from the scope and principles of this invention. For example, the details of the input drive sytem for the low range ring gear, the high range carrier and the variable speed device can readily be modified. As a result, the embodiment described herein is subject to various modifications, changes and the like, with the scope of this invention being determined solely by reference to the claims appended hereto.

What is claimed is:
1. A transmission comprising in combination:
   a. first planetary means having operatively interconnected first, second, third and fourth elements;
   b. a variable speed control shaft connected to rotate and be rotated by said first element;
   c. a variable speed device connected with said control shaft to provide means for controllably varying the rotative speed of said control shaft;
   d. a first shaft connected to rotate and be rotated by said third element;
   e. said fourth element being in constant mesh with said second element;
   f. means for moving said first element into mesh with said second element when the pitch line velocity of said second element, relative to said third element, is substantially the same as the pitch line velocity of said first element, and out of mesh with said second element when said first and second elements are rotating under load; and
   g. means for rotating said fourth element and consequently said second element when said first element is not in mesh with said second element, said means for rotating also rotating said second element when said first element is in mesh with said second element and said control shaft is rotating at a selected speed relative to the speed of said second element.
2. The transmission of claim 1 further including:
   a. second planetary means, axially spaced from and drivingly interconnected with said first planetary means, said second planetary means having operatively interconnected fifth, sixth, seventh and eighth elements;
   b. said eighth element being connected with to rotate and be rotated by said third element, said eighth element also being in constant mesh with said sixth element;
   c. said variable speed control shaft also being connected to rotate and be rotated by said fifth element; and
   d. said means for moving also being capable of moving said fifth element into mesh with said sixth element, when the pitch line velocity of said sixth element, relative to said seventh element, is substantially the same as the pitch line velocity of said fifth element, and out of mesh with said sixth element when said fifth and sixth elements are rotating under load, said fifth element being in full mesh with said sixth element only when said first element is not in mesh with said second element.
3. The transmission of claim 2 further including means for rotating said seventh element and consequently said sixth element when said fifth element is not in mesh with said sixth element, said means for rotating also rotating said sixth element when said fifth element is in mesh with said sixth element and said control shaft is rotating at a selected speed relative to the speed of said sixth element.
4. The transmission of claim 3 wherein said first element may be moved in and out of mesh with said second element while said fifth element is still in mesh with said sixth element and vice versa when said control shaft is rotating at a selected speed relative to the speed of said second and sixth elements.
5. The transmission of claim 3 wherein said first planetary means includes a first sun gear as said first element, a first ring gear as said fourth element, a first planet carrier as said third element, and a first planet gear carried by said first planet carrier as said second element, said first planet gear being in mesh with both said first sun gear and said first ring gear, and wherein said second planetary means includes a second sun gear as said fifth element, a second ring gear as said eighth element, a second planet carrier as said seventh element, and a second planet gear carried by said second planet carrier as said sixth element, said second planet gear being in mesh with both said second ring gear and said second sun gear.
6. The transmission of claim 5 wherein the operating pitch circles of said first and second sun gears are tangent with the operating pitch circles of said first and second planet gears, respectively, and wherein said first sun gear is axially movable into and out of mesh with said first planet gear while said second sun gear is still in mesh with said second planet gear and said second sun gear is axially movable into and out of mesh with said second planet gear while said first sun gear is still in mesh with said first planet gear when said control shaft is rotating at a selected speed relative to the speed of said first and second planet gears.
7. The transmission of claim 6 wherein said first shaft is an output shaft.
8. The transmission of claim 6 wherein said means for rotating said fourth element includes an input shaft, a first input gear affixed to said input shaft, a first intermediate gear in mesh with said first input gear and said first intermediate gear is operatively interconnected for rotation with said fourth element.
9. The transmission of claim 8 wherein said means for rotating said seventh element includes said input shaft, a second input gear affixed to said input shaft, a second intermediate gear in mesh with said second input gear and said second intermediate gear is affixed to a portion of said seventh element.
10. A variable speed dual-path transmission with two infinitely variable speed ranges comprising:
    a. first planetary means having first, second, third and fourth elements;
    b. second planetary means, axially spaced and operatively interconnected with said first planetary means, said second planetary means having fifth, sixth, seventh and eighth elements;

c. said fourth element being in constant mesh with said second element, said eighth element being connected to rotate and be rotated by said third element, and said eighth element also being in constant mesh with said sixth element;

d. a variable speed control shaft connected to rotate and be rotated by said first and fifth elements;

e. a variable speed device connected with said control shaft to provide means for controllably varying the rotative speed of said control shaft;

f. an input shaft drivingly connected with said variable speed device as well as said forth and seventh elements;

g. an output shaft connected to rotate and be rotated by said third and eight elements; and h. means for alternatively first moving said first element into mesh with said second element when the pitch line velocity of said second element, relative to said third element, is substantially the same as the pitch line velocity of said first element and out of mesh with said second element when said first and second elements are rotating under load, and secondly for moving said fifth element into mesh with said sixth element when the pitch line velocity of said sixth element, relative to said seventh element, is substantially the same as the pitch line velocity of said fifth element and out of mesh with said sixth element when said fifth and sixth elements are rotating under load, said means for moving being activated only when said control shaft is rotating at a selected speed relative to the speed of said second and sixth elements.

11. The transmission of claim 10 wherein said first element may be moved in and out of mesh with said second element while said fifth element is still in mesh with said sixth element and vice versa when said control shaft is rotating at a selected speed relative to the speed of said second and sixth elements.

12. The transmission of claim 11 wherein said first planetary means includes a first sun gear as a first element, a first ring gear as said fourth element, a first planet carrier as said third element, and a first planet gear carried by said first planet carrier as said second element, said first planet gear being in mesh with both said first sun gear and said first ring gear, and wherein said second planetary means includes a second sun gear as said fifth element, a second ring gear as said eighth element, a second planet carrier as said seventh element, and a second planet gear carried by said second planet carrier as said sixth element, said second planet gear being in mesh with both said second ring gear and said second sun gear.

* * * * *